(12) United States Patent
Baduge

(10) Patent No.: US 9,306,824 B2
(45) Date of Patent: Apr. 5, 2016

(54) COMMUNICATION CONTROL APPARATUS, COMMUNICATION CONTROL METHOD, AND COMPUTER-READABLE NON-TRANSITORY RECORDING MEDIUM

(71) Applicant: Panasonic Intellectual Property Management Co., Ltd., Osaka (JP)

(72) Inventor: Thilmee Baduge, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 93 days.

(21) Appl. No.: 14/474,938

(22) Filed: Sep. 2, 2014

(65) Prior Publication Data
US 2015/0074484 A1 Mar. 12, 2015

(30) Foreign Application Priority Data

Sep. 11, 2013 (JP) .................................. 2013-187927

(51) Int. Cl.
H04L 1/18 (2006.01)
H04L 12/26 (2006.01)

(52) U.S. Cl.
CPC ............ *H04L 43/0829* (2013.01); *H04L 1/189* (2013.01); *H04L 12/26* (2013.01)

(58) Field of Classification Search
CPC ... H04L 1/0809; H04L 1/1812; H04L 1/1887; H04L 1/1819
See application file for complete search history.

(56) References Cited

U.S. PATENT DOCUMENTS

| 6,336,200 B1* | 1/2002 | Wolfgang | H03M 13/03 714/752 |
| 6,639,885 B1* | 10/2003 | Yada | G11B 20/1879 369/53.45 |
| 6,778,551 B1* | 8/2004 | Oh | H04L 12/4013 370/445 |
| 7,839,858 B2* | 11/2010 | Wiemann | H04L 1/0002 370/394 |
| 7,948,871 B2* | 5/2011 | Balasubramanian ... | H04W 8/12 370/216 |
| 8,024,634 B2* | 9/2011 | Schmidt | H04L 1/1867 714/748 |
| 8,381,060 B2* | 2/2013 | Yoshimoto | H04J 11/0023 714/748 |
| 8,856,610 B2* | 10/2014 | Tada | H03M 13/05 714/752 |
| 2012/0233516 A1* | 9/2012 | Gondo | H04L 1/0045 714/746 |

FOREIGN PATENT DOCUMENTS

| JP | 2005-045469 | 2/2005 |
| JP | 3871661 | 1/2007 |
| JP | 2007-150859 | 6/2007 |
| JP | 4699187 | 6/2011 |
| JP | 5117512 | 1/2013 |
| WO | 2011/064810 | 6/2011 |

* cited by examiner

*Primary Examiner* — Esaw Abraham
(74) *Attorney, Agent, or Firm* — Greenblum & Bernstein, P.L.C.

(57) ABSTRACT

A communication control apparatus that controls, in a second communication device, data communication from a first communication device to the second communication device, the second communication device transferring data received from the first communication device to a third communication device, the communication control apparatus including a first obtaining section that obtains a permitted reproduction period of the second communication device, this period being a period during which reproduction of data identical to lost data is permitted, a second obtaining section that obtains a first recovery period used for recovery of the lost data in the third communication device, and a control section that controls loss recovery processing in the second communication device, the lost data being recovered by the second communication device within a time difference that is a period obtained by subtracting the first recovery period from the permitted reproduction period.

10 Claims, 14 Drawing Sheets

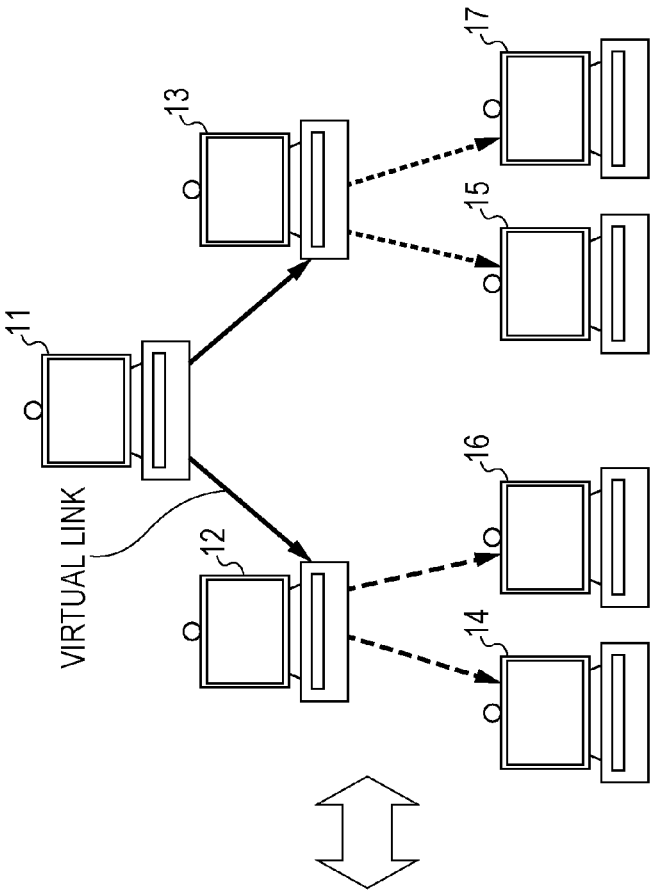
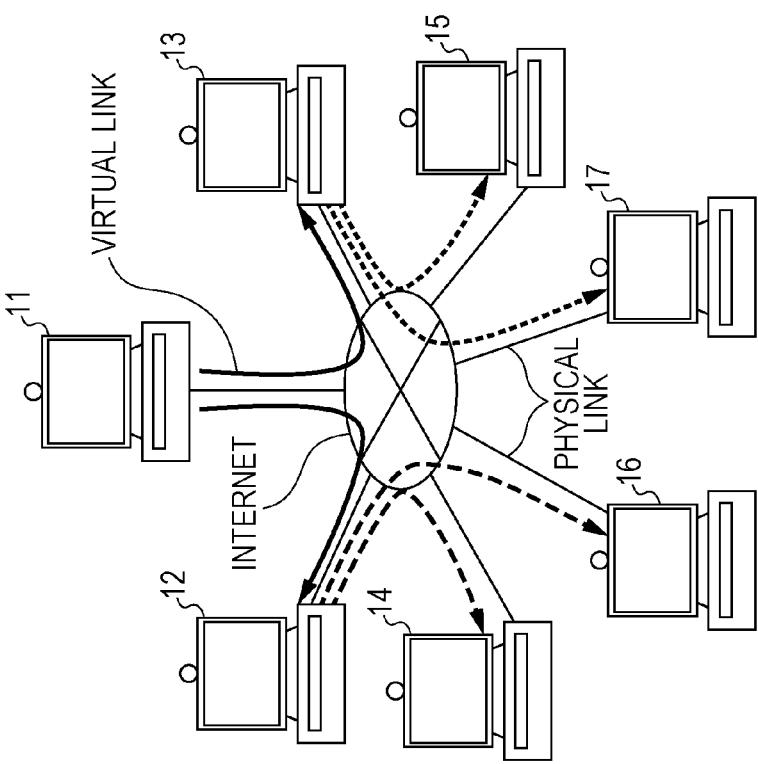

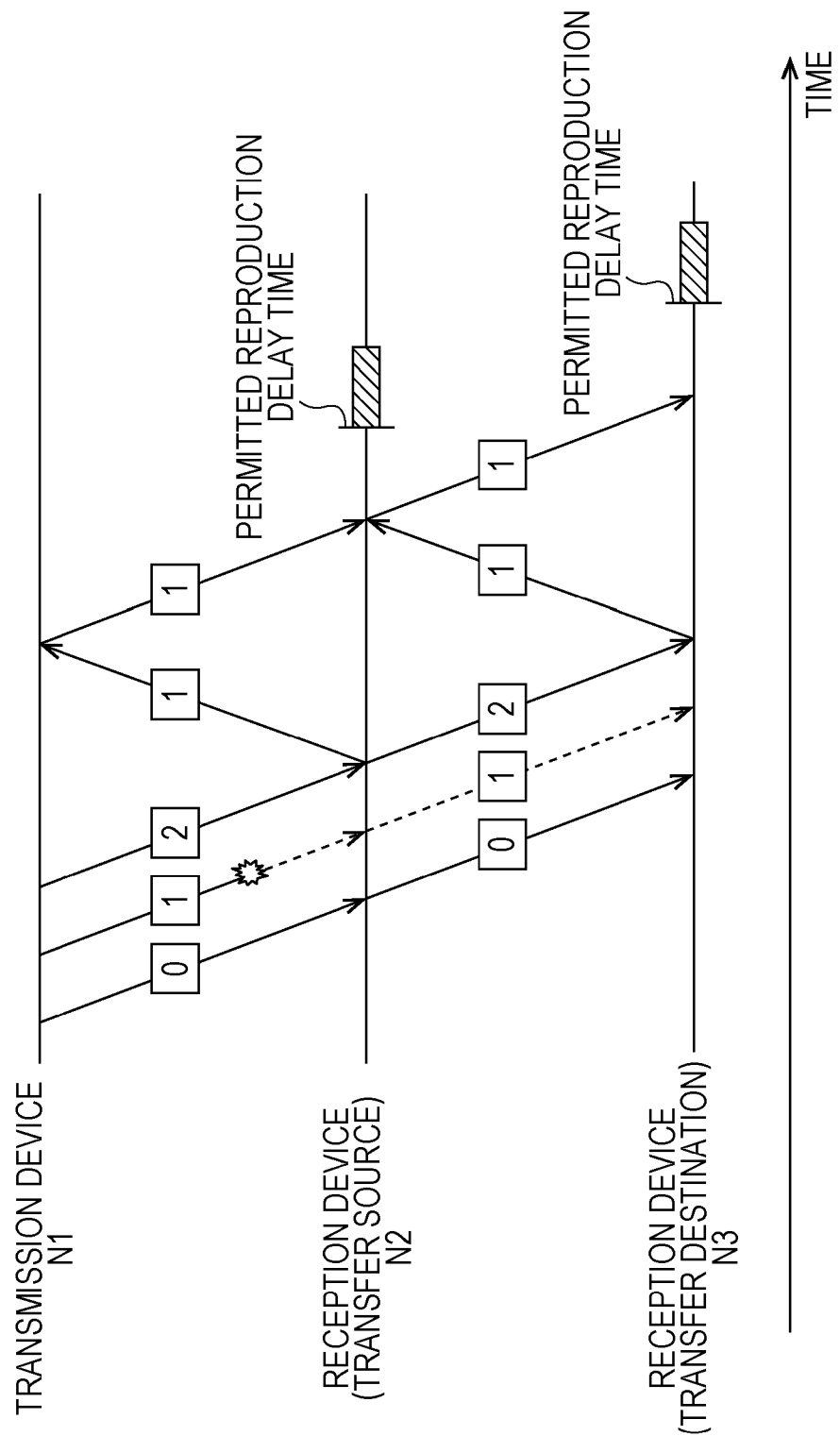

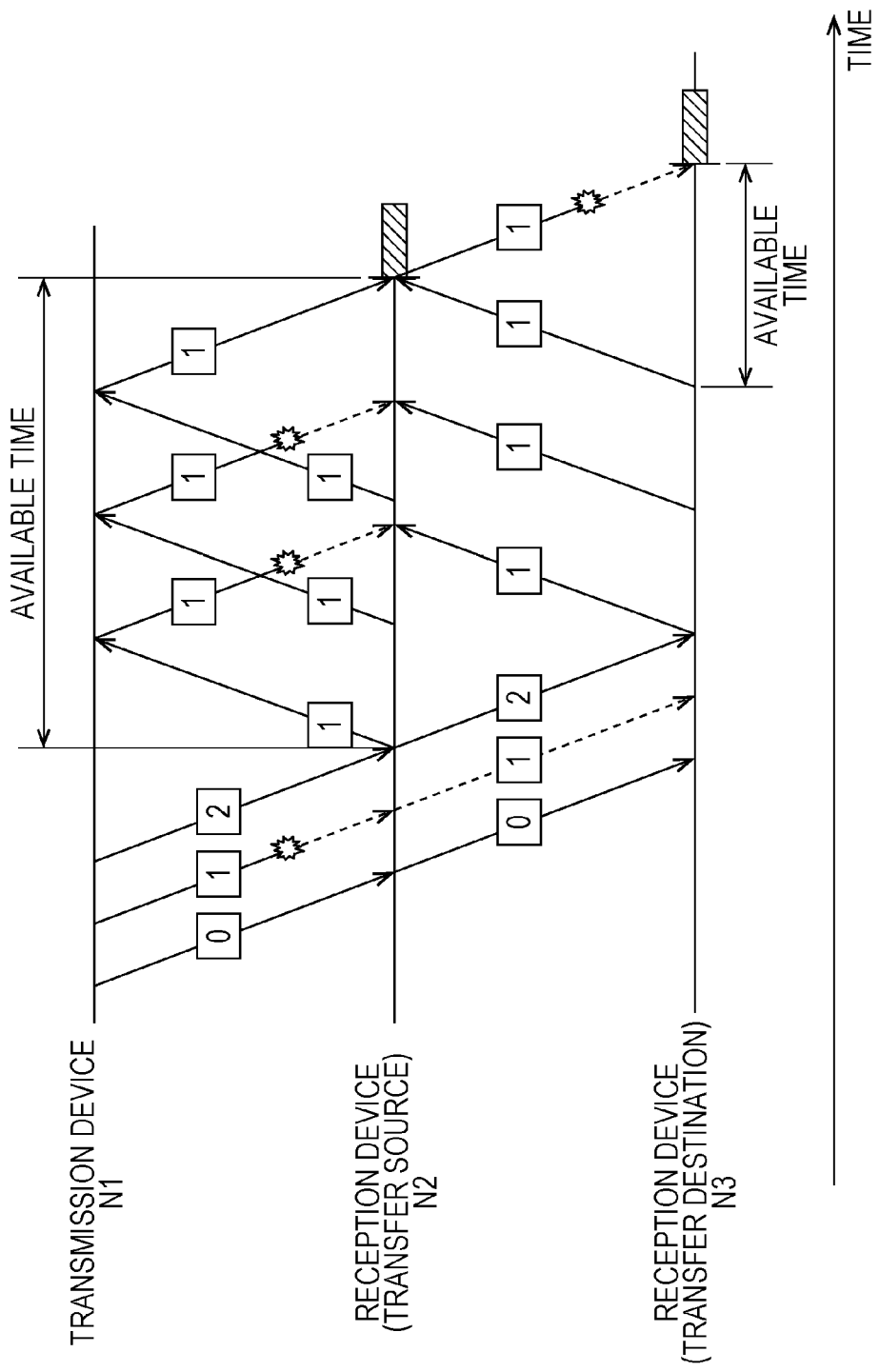

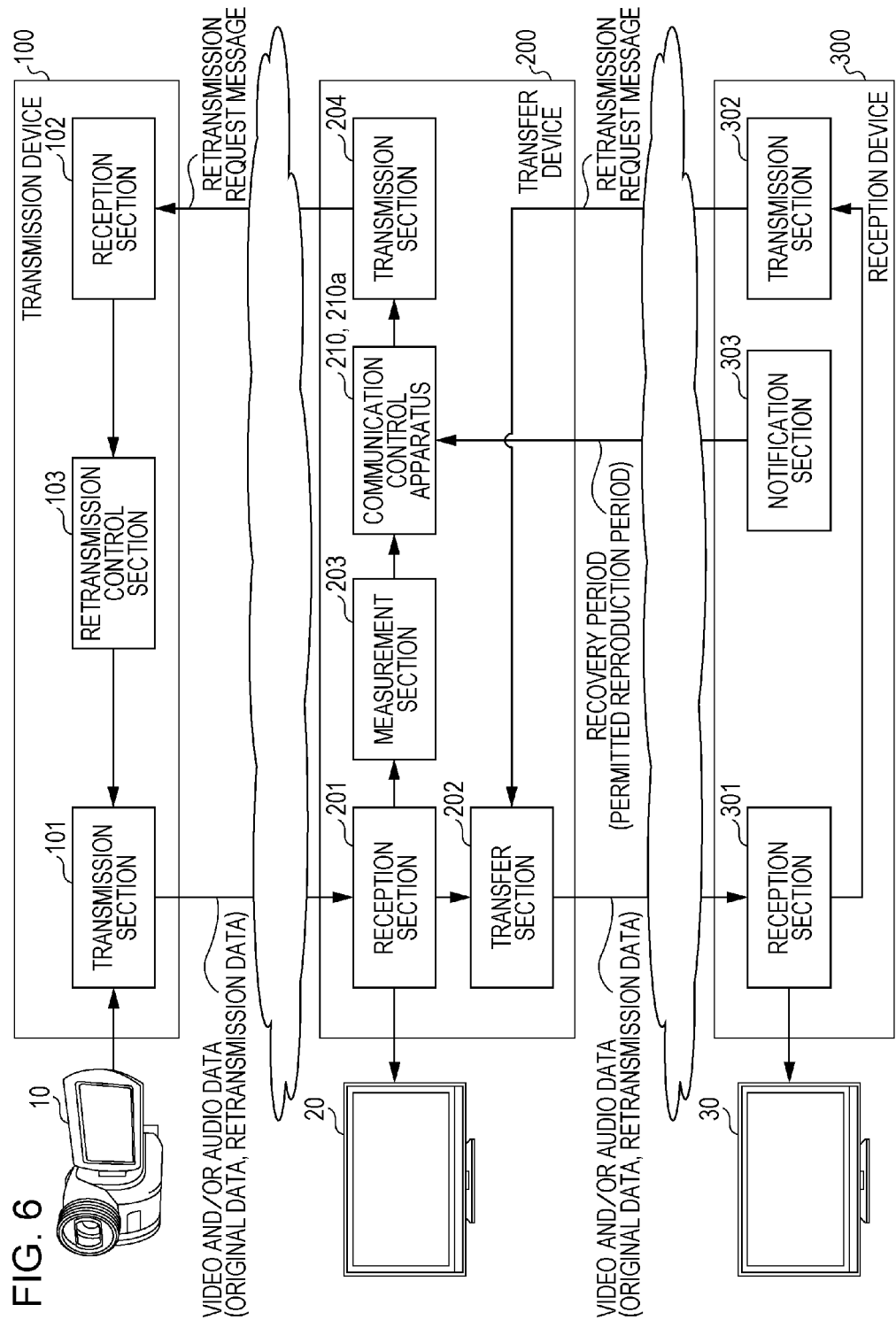

COMMUNICATION CONTROL APPARATUS, COMMUNICATION CONTROL METHOD, AND COMPUTER-READABLE NON-TRANSITORY RECORDING MEDIUM

BACKGROUND OF THE INVENTION

1. Field of the Invention

The present disclosure relates to a communication control apparatus, a communication control method, and a computer-readable non-transitory recording medium with which recovery of data lost in the middle of a communication path is controlled.

2. Description of the Related Art

In order to recover data loss during data communication, a retransmission request message, which is a message that requests retransmission of a packet identical to a lost packet, is transmitted from a reception device to a transmission device, for example. The transmission device that has received the retransmission request message retransmits the packet identical to the lost packet to thereby recover packet loss (data loss).

However, in the case where a reception device (second communication device) that has received data from a transmission device (first communication device) further transfers the data to another reception device (third communication device), the third communication device may not be able to appropriately recover data loss.

SUMMARY OF THE INVENTION

One non-limiting and exemplary embodiment provides a communication control apparatus that is able to appropriately recover data loss in the case where the second communication device that has received data from the first communication device transfers the data to the third communication device.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

In one general aspect, the techniques disclosed here feature: a communication control apparatus that controls, in a second communication device, data communication from a first communication device to the second communication device, the second communication device transferring data received from the first communication device to a third communication device, the communication control apparatus including a first obtaining section, a second obtaining section, and a control section. The first obtaining section is configured to obtain a permitted reproduction period of the second communication device, the permitted reproduction period being a time period from a time when the second communication device receives data subsequent to lost data until a time up to which reproduction of data identical to the lost data is permitted. The second obtaining section is configured to obtain a first recovery period used for recovery of the lost data in the third communication device. The control section is configured to control loss recovery processing in the second communication device, the lost data being recovered by the second communication device within a time difference that is a period obtained by subtracting the first recovery period from the permitted reproduction period.

Note that general and specific aspects including the above-described aspect may be implemented in a form of a system, a method, an integrated circuit, a computer program, or a computer-readable recording medium, such as a compact disk read-only memory (CD-ROM), or may be implemented using any combination of a system, a method, an integrated circuit, a computer program, and a recording medium.

The communication control apparatus according to one aspect of the present disclosure is able to appropriately recover data loss in the case where the second communication device that has received data from the first communication device transfers the data to the third communication device.

BRIEF DESCRIPTION OF THE DRAWINGS

FIGS. 3A and 3B are diagrams for describing application layer multicast (ALM).

FIG. 4 is a diagram illustrating an overview of retransmission operations to be performed in the case where data is transmitted using ALM.

FIG. 5 is a diagram for describing an example in which a sufficient recovery rate is unable to be attained in a reception device that is a transfer destination in the case where data is transmitted using ALM.

FIG. 6 is a diagram illustrating a configuration of a communication system according to a first embodiment.

DESCRIPTION OF THE PREFERRED EMBODIMENTS

Background Findings Related to Disclosure

Figure 1A:
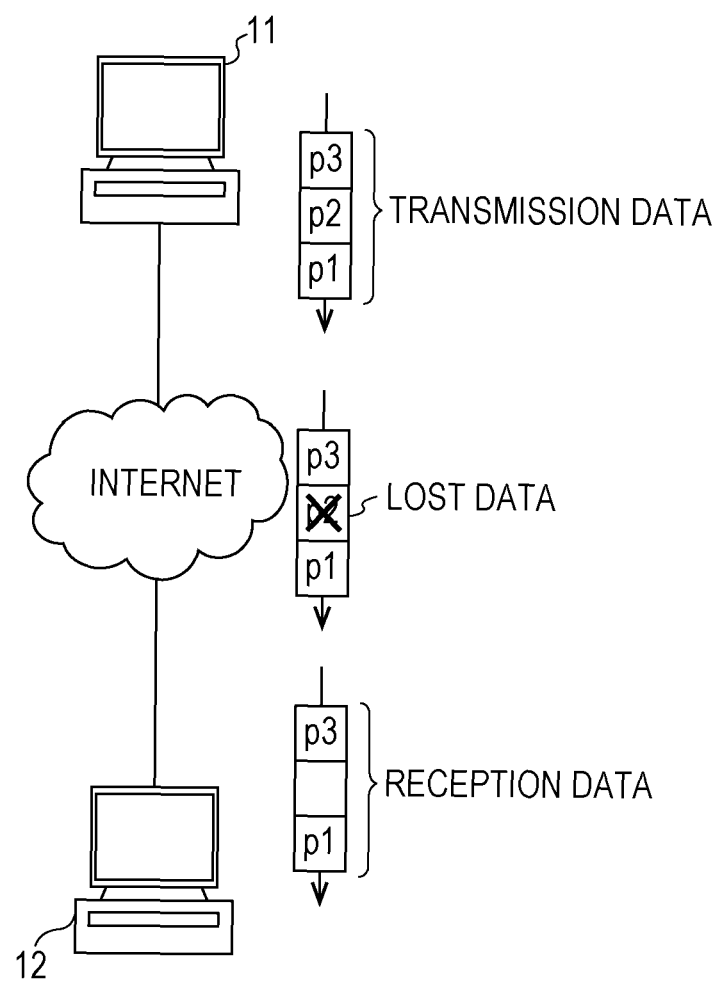
FIG. 1A is a diagram for describing data loss during data communication.

Data loss may occur on a communication path during data communication. For example, as illustrated in FIG. 1A, in the case of transmitting and receiving video and/or audio data over the Internet, loss of video and/or audio data (packet loss) may occur. In such a case, images and/or sounds reproduced by a receiver may be distorted. As a method of preventing such distortion of images and/or sounds, ARQ has been available.

Figure 1B:
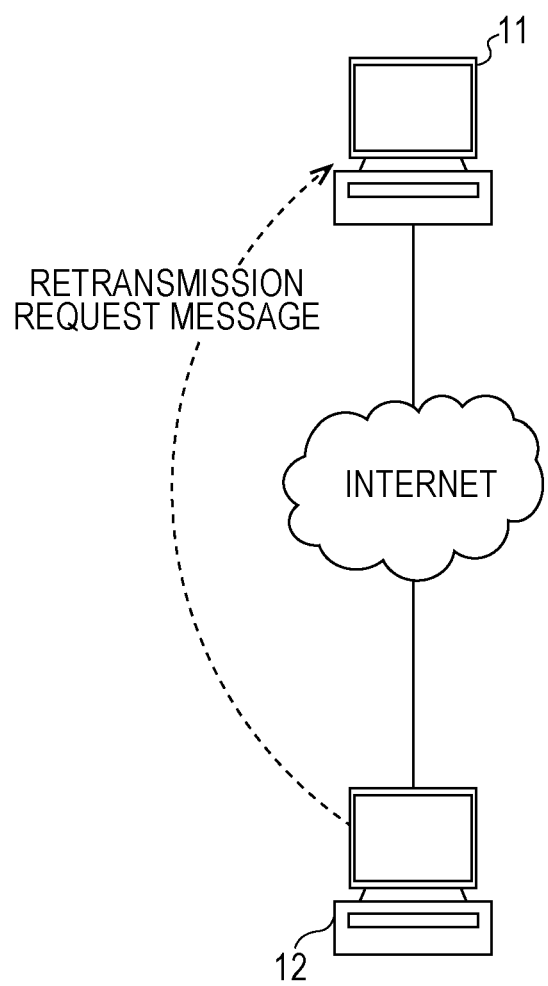
FIG. 1B is a diagram for describing automatic retransmission request (ARQ).
Figure 1C:
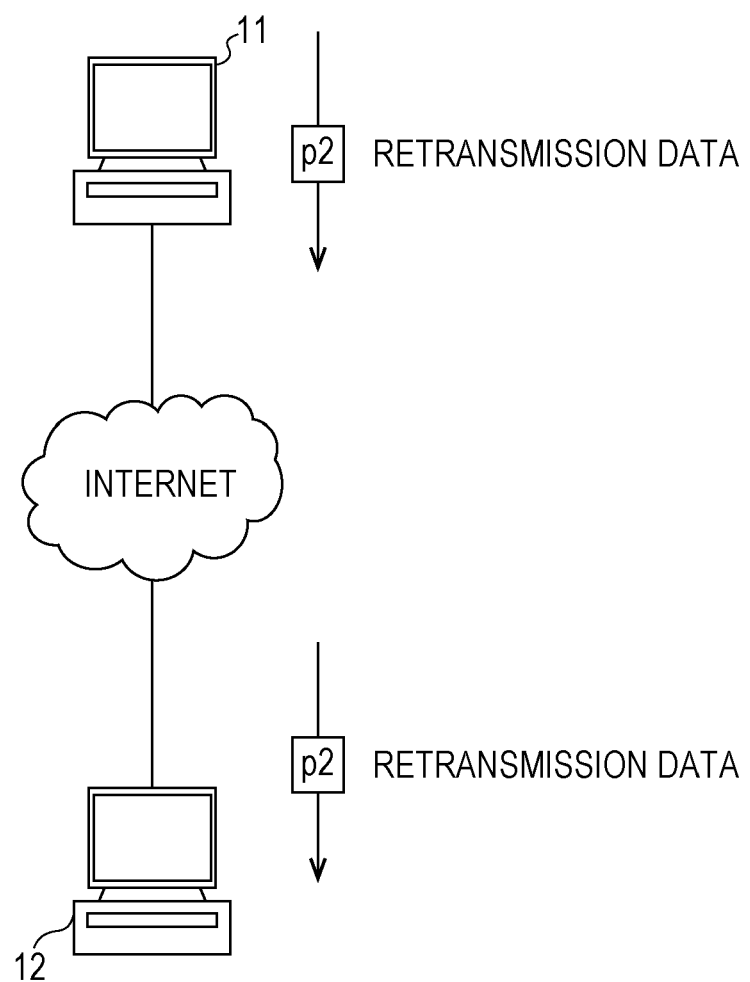
FIG. 1C is a diagram for describing ARQ.

FIGS. 1B and 1C are diagrams for describing ARQ. In ARQ, a reception device 12 requests a transmission device 11 to retransmit data identical to lost data (FIG. 1B), and the transmission device 11 retransmits the data identical to the lost data to the reception device 12 (FIG. 1C).

Figure 2A:
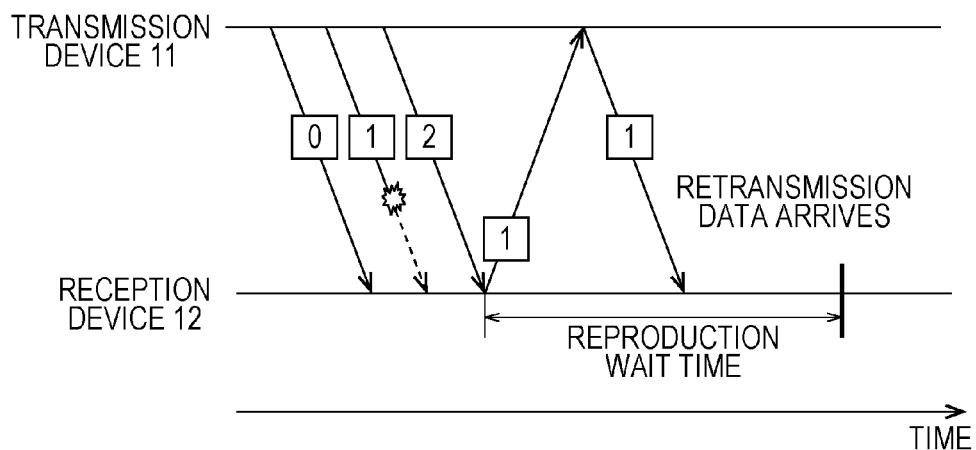
FIG. 2A is a diagram for describing retransmission of data identical to lost data.
Figure 2B:
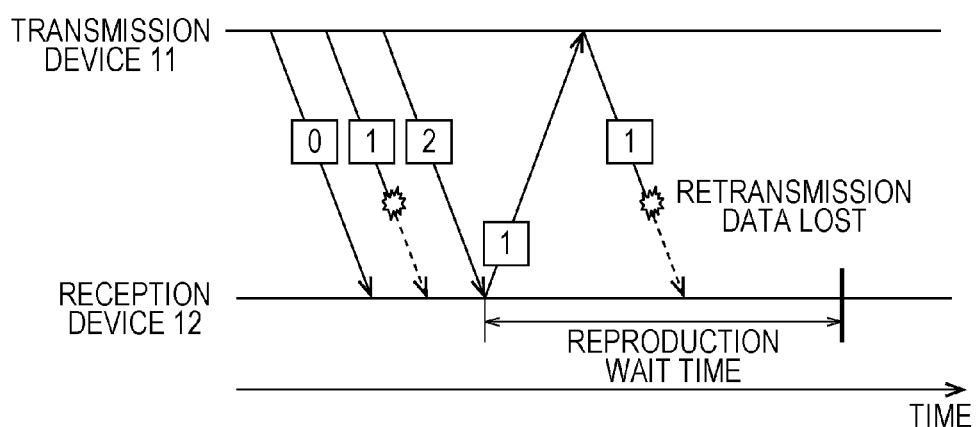
FIG. 2B is a diagram for describing retransmission of data identical to lost data.

FIGS. 2A and 2B are diagrams for describing retransmission of data identical to lost data. In FIGS. 2A and 2B, data packets respectively having the sequence numbers "0" to "2" are transmitted, and loss of the data packet having the sequence number "1" occurs. Then, a retransmission request message that requests retransmission of the data packet having the sequence number "1" is transmitted from the reception device 12 to the transmission device 11.

Figure 2C:
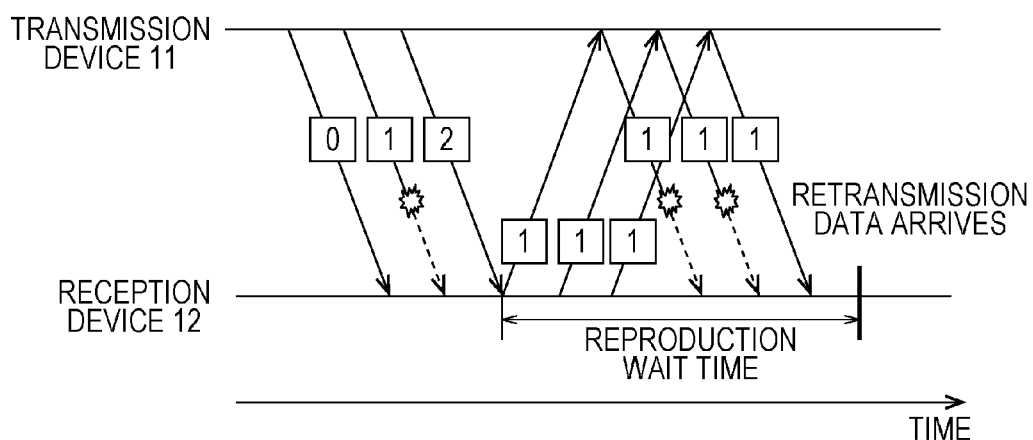
FIG. 2C is a diagram for describing a plurality of times of retransmission of data identical to lost data.

Data identical to lost data which is retransmitted in response to the retransmission request message (hereinafter referred to as "retransmission data") (i) may arrive at the reception device 12 without being lost (FIG. 2A) or (ii) may be lost again and may not arrive at the reception device 12 (FIG. 2B). Taking into consideration such loss of retransmission data, it is effective to transmit the retransmission data a plurality of times until the retransmission data arrives at the reception device 12 as illustrated in FIG. 2C.

However, in the case of transmitting retransmission data a plurality of times as described above, it is difficult to appropriately control the number of transmission trials. For example, if the number of transmission trials is too large, extra traffic is generated in the network. On the other hand, if the number of transmission trials is too small, failure of data loss recovery may occur. Accordingly, the number of retransmission trials may be adjusted so as to be appropriate for the reception status of data received from the network.

Japanese Patent No. 3871661 shows that a retransmission request is repeatedly transmitted at a retransmission request interval determined on the basis of a buffering time so that the number of repetitions does not exceed the maximum number of retransmission trials. Japanese Patent No. 4699187 shows that the number of transmission trials and the interval between transmissions of a retransmission request for achieving an inputted permitted loss rate are determined on the basis of the delay time in a receiver. Japanese Patent No. 5117512 shows that the retransmission limit number of each packet is determined on the basis of a desired reception success probability that is appropriate for the characteristic of each packet (I packet, P packet, or the like).

Any of the above-mentioned writings show that retransmission of data identical to lost data is performed so that the data loss is recovered within the permitted reproduction period of the reception device. Therefore, even in the case of occurrence of data loss, the reception device is able to reproduce data without any problem basically.

However, in the case where a reception device (transfer source) transfers data received from a transmission device to another reception device (transfer destination), data loss may not be appropriately recovered in the transfer destination. For example, in the case where data is transferred using ALM, a sufficient recovery rate may not be attained in a reception device that is a grandchild node. Note that ALM is a technique in which each reception device duplicates and transfers data to thereby efficiently transmit data from one transmission device to a plurality of reception devices.

FIGS. 3A and 3B illustrate an overview of ALM. As illustrated in FIG. 3A, data is transmitted from the transmission device 11 to a plurality of reception devices 12 to 17 over the Internet. In this case, in ALM, the data is transmitted along a data delivery tree formed by virtual links as illustrated in FIG. 3B.

Here, an overview of retransmission operations to be performed in the case where data is transmitted using ALM will be described with reference to FIG. 4.

In ALM, first, data arrives at a reception device (N2) from a transmission device (N1), the reception device (N2) being directly connected to the transmission device (N1) logically. The data is thereafter transferred from the reception device (N2) to another reception device (N3).

In such circumstances, packets respectively having the sequence numbers "0" to "2" are transmitted from the transmission device (N1) to the reception device (N2) and thereafter to the reception device (N3) in FIG. 4. In this case, the packet having the sequence number "1" is lost in the section between the transmission device (N1) and the reception device (N2) (hereinafter referred to as "section N1-N2"). A similar section will be referred to in a similar manner hereinafter.

Here, when loss of the packet having the sequence number "1" is detected, the reception device (N2) transmits a retransmission request message to the transmission device (N1), which is a transmission source of the packet. When the transmission device (N1) receives the retransmission request message, the transmission device (N1) retransmits the packet having the sequence number "1" to the reception device (N2). As a result, the reception device (N2) is able to obtain all of the packets respectively having the sequence numbers "0" to "2" and is able to completely restore the lost data.

The reception device (N3) also detects loss of the packet having the sequence number "1" because the packet having the sequence number "1" does not arrive at the reception device (N3) at an originally expected time (as the reception device (N2) is unable to transfer the packet).

Accordingly, the reception device (N3) also transmits a retransmission request message to the reception device (N2) that is a transfer source similarly to the reception device (N2). When the reception device (N2) receives the retransmission request message, the reception device (N2) transmits the packet having the sequence number "1" to the reception device (N3). As a result, the reception device (N3) is also able to obtain all of the packets respectively having the sequence numbers "0" to "2".

Here, an example will be described with reference to FIG. 5 in which a sufficient recovery rate is unable to be attained in a reception device that is a transfer destination in the case where data is transmitted using ALM.

In FIG. 5, the packet having the sequence number "1" is lost in the section N1-N2 as illustrated in FIG. 4. Here, it is assumed that the data loss rate of the section N1-N2 is equal to the data loss rate of the section N2-N3 (for example, 1%). Then, the number of retransmission trials of data identical to lost data needed for recovery of data loss (the number of transmission trials of a retransmission request message) is determined in accordance with the data loss rate (the number of retransmission trials is three in FIG. 5).

Accordingly, the reception device (N2) and the reception device (N3) transmit retransmission request messages to the respective transmission sources a number of times equal to the number of retransmission trials (three times in FIG. 5) as illustrated in FIG. 5. Here, the transmission device (N1) has retained data identical to lost data requested from the reception device (N2). Therefore, the transmission device (N1) is able to transmit the data identical to the lost data in response to each of the received retransmission request messages.

On the other hand, the reception device (N2) is unable to retain the data identical to the lost data unless the reception device (N2) receives the data identical to the lost data from the transmission device (N1). Therefore, even if the reception device (N2) receives a retransmission request message from the reception device (N3), the reception device (N2) is unable to transmit the data identical to the lost data to the reception device (N3) until the reception device (N2) receives the data identical to the lost data from the transmission device (N1). That is, although the reception device (N2) has received a retransmission request message from the reception device (N3) three times, the reception device (N2) is able to transmit the data identical to the lost data only once. In other words, the time (available time) that can be effectively used by the reception device (N3) that is a transfer destination for recovery of data loss is shorter than the available time of the reception device (N2) that is a transfer source. Consequently, the data identical to the lost data is not transmitted to the reception device (N3) that is a transfer destination a number of times equal to the determined number of retransmission trials. Therefore, a sufficient recovery rate is unable to be attained in the reception device (N3).

Accordingly, a communication control apparatus according to one aspect of the present disclosure is a communication control apparatus that controls, in a second communication device, data communication from a first communication device to the second communication device, the second communication device transferring data received from the first communication device to a third communication device, the communication control apparatus including a first obtaining section, a second obtaining section, and a control section. The first obtaining section is configured to obtain a permitted reproduction period of the second communication device, the permitted reproduction period being a time period from a time when the second communication device receives data subsequent to lost data until a time up to which reproduction of data identical to the lost data is permitted. The second obtaining section is configured to obtain a first recovery period used for recovery of the lost data in the third communication device. The control section is configured to control loss recovery processing in the second communication device, the lost data being recovered by the second communication device within a time difference that is a period obtained by subtracting the first recovery period from the permitted reproduction period.

According to the configuration described above, loss recovery processing in the second communication device can be controlled so that data loss is recovered in the second communication device within the time difference between the permitted reproduction period of the second communication device, which is a transfer source, and the recovery period of the third communication device, which is a transfer destination. Therefore, it is possible to recover the data loss in the second communication device while a time needed for recovery of the lost data in the third communication device is secured. That is, in the case where the second communication device that has received data from the first communication device transfers the data to the third communication device, it is possible to appropriately recover data loss. For example, in the case of delivering video and/or audio data using, for example, ALM, it is possible to efficiently recover loss of a packet of video and/or audio data occurring in the Internet and it is possible to improve the reproduction quality of images and/or sounds.

For example, the control section may control the loss recovery processing in the second communication device by controlling, in accordance with the time difference, an interval between transmissions of a retransmission request message that requests retransmission of the data identical to the lost data in the case where the retransmission request message is repeatedly transmitted from the second communication device to the first communication device.

According to the configuration described above, the interval between transmissions of a retransmission request message can be controlled in accordance with the time difference. Therefore, the number of transmission trials of a retransmission request message (the number of request trials) need not be changed in order to recover data loss within the time difference. As a result, it is possible to secure the number of transmission trials of a retransmission request message (the number of request trials) needed for recovery of lost data regardless of the time difference, and data loss can be appropriately recovered in the second communication device.

For example, the communication control apparatus may further include a determination section configured to determine a number of request trials, which is a number of transmission trials of the retransmission request message to be transmitted from the second communication device to the first communication device, in accordance with a communication status that indicates a frequency of occurrence of data loss during data communication between the first communication device and the second communication device. The control section may control the interval between transmissions in accordance with the time difference and the number of request trials.

According to the configuration described above, the number of request trials can be determined in accordance with the frequency of occurrence of data loss. Therefore, the number of request trials needed for recovery of lost data can be appropriately determined in accordance with the communication status.

For example, the data communication between the first communication device and the second communication device may be packet communication, the communication status may include a packet loss rate in the packet communication between the first communication device and the second communication device, and the determination section may determine the number of request trials such that the number of request trials becomes larger as the packet loss rate increases.

According to the configuration described above, the number of retransmission trials can be determined in accordance with the packet loss rate, and it becomes possible to appropriately recover packet loss during packet communication.

For example, in a case where the number of request trials is denoted by K1, the packet loss rate is denoted by LR1, and a target value of a probability of the retransmitted data identical to the lost data arriving at the second communication device at least once is denoted by $\alpha 1$, an expression, $1-(LR1)^{K1} \geq \alpha 1$, may be satisfied.

According to the configuration described above, the number of retransmission trials can be determined so as to satisfy the target value of the probability of data identical to lost data arriving at the second communication device at least once, and it becomes possible to appropriately recover packet loss during packet communication.

For example, the data transferred from the second communication device to the third communication device may be further transferred from the third communication device to a fourth communication device, the second obtaining section may further obtain a second recovery period used for recovery of the lost data in the fourth communication device, and the control section may control the loss recovery processing in the second communication device so that the lost data is recovered in the second communication device within a time difference between the permitted reproduction period and the sum of the first recovery period and the second recovery period.

According to the configuration described above, in the case where data is transferred from the transfer destination (third communication device) to the fourth communication device, loss recovery processing in the second communication device can be controlled so that data loss is recovered in the second communication device within the time difference between the permitted reproduction period of the second communication device and the sum of the first recovery period of the third communication device and the second recovery period of the fourth communication device. Therefore, it is possible to recover data loss in the second communication device while a time available for recovery of the lost data is secured in the third communication device and the fourth communication device.

For example, the first obtaining section may further obtain a permitted reproduction period of the third communication device, and the control section may control the loss recovery processing in the second communication device in accordance with the permitted reproduction period of the third communication device instead of the permitted reproduction period of the second communication device in a case where the permitted reproduction period of the third communication device is shorter than the permitted reproduction period of the second communication device.

According to the configuration described above, loss recovery processing in the second communication device can be controlled in accordance with the permitted reproduction period of the third communication device instead of the permitted reproduction period of the second communication device in the case where the permitted reproduction period of the third communication device is shorter than the permitted reproduction period of the second communication device. Therefore, it is possible to more appropriately secure a time needed for recovery of lost data in the third communication device.

Hereinafter, embodiments will be specifically described with reference to the drawings, however, needless detailed description may be omitted. For example, detailed description of a well-known matter or duplicated description of the substantially same configurations may be omitted in order to avoid needlessly lengthy description being given below and to facilitate understanding of those skilled in the art.

Embodiments described hereinafter indicate specific or generic examples of the present disclosure. The values, shapes, materials, constituent elements, positions and connections of the constituent elements, steps, and orders of the steps indicated in Embodiments are examples, and do not limit the present disclosure. The constituent elements in Embodiments that are not described in independent Claims that describe the most generic concept of the present disclosure are described as arbitrary constituent elements.

First Embodiment
Configuration
Configuration of Communication System

FIG. 6 illustrates a configuration of a communication system according to a first embodiment. FIG. 6 illustrates a remote display system in which video and/or audio data are transmitted and received, as an example of the communication system. The remote display system includes an input device 10, output devices 20 and 30, a transmission device 100, a transfer device 200 that includes a communication control apparatus 210, and a reception device 300.

The input device 10 transmits video and/or audio data to the transmission device 100. The input device 10 is, for example, a digital video camera, a digital still camera, a voice recorder, a smartphone, or a tablet computer.

The transmission device 100 is an example of the first communication device. Specifically, the transmission device 100 is, for example, a personal computer, a smartphone, a tablet computer, or a communication adapter. The transmission device 100 transmits video and/or audio data to the transfer device 200 over the Internet.

The transfer device 200 is an example of the second communication device. Specifically, the transfer device 200 is, for example, a personal computer, a set top box, a disc player or a recorder, or a communication adapter. The transfer device 200 transmits to the output device 20 video and/or audio signals obtained by reproducing received video and/or audio data that has been transmitted from the transmission device 100. Furthermore, the transfer device 200 transfers to the reception device 300 the received video and/or audio data that has been transmitted from the transmission device 100.

The reception device 300 is an example of the third communication device. Specifically, the reception device 300 is, for example, a personal computer, a set top box, a disc player or a recorder, or a communication adapter. The reception device 300 transmits to the output device 30 video and/or audio signals obtained by reproducing video and/or audio data received from the transfer device 200.

The output devices 20 and 30 output images, sounds, or both images and sounds on the basis of video and/or audio signals. The output devices 20 and 30 are, for example, televisions, personal computers, smartphones, or tablet computers.

Next, configurations of the transmission device 100, the transfer device 200, and the reception device 300 in this embodiment will be described in further detail.

Configuration of Transmission Device

The transmission device 100 includes a transmission section 101, a reception section 102, and a retransmission control section 103.

The transmission section 101 transmits video and/or audio data obtained from the input device 10 to the transfer device 200 over the Internet. Specifically, the transmission section 101 first transmits video and/or audio data (original data). The transmission section 101 transmits video and/or audio data (retransmission data) as instructed by the retransmission control section 103.

The reception section 102 receives a retransmission request message from the transfer device 200. Then, the reception section 102 communicates the retransmission request message to the retransmission control section 103. The retransmission request message is a message that requests retransmission of data identical to lost data.

In the case where a retransmission request message has been received, the retransmission control section 103 retransmits data identical to lost data to the transfer device 200 via the transmission section 101. For example, the retransmission control section 103 retransmits a packet corresponding to the lost data among a plurality of packets retained in the transmission section 101 or a buffer memory (not illustrated).

Configuration of Transfer Device

The transfer device 200 includes a reception section 201, a transfer section 202, a measurement section 203, a transmission section 204, and the communication control apparatus 210.

The reception section 201 receives video and/or audio data from the transmission device 100. The reception section 201 transmits the received video and/or audio data to the transfer section 202. Furthermore, the reception section 201 transmits video and/or audio signals obtained by reproducing the received video and/or audio data to the output device 20. For example, the reception section 201 generates video and/or audio signals by decoding coded video and/or audio data and transmits the generated video and/or audio signals to the output device 20.

The reception section 201 communicates information used to measure the communication status to the measurement section 203. The communication status indicates the frequency of occurrence of data loss during data communication between the transmission device 100 and the transfer device 200. For example, in the case where data communication between the transmission device 100 and the transfer device 200 is packet communication, the communication status may include the packet loss rate. In this case, the reception section 201 communicates the sequence numbers of a plurality of packets received from the transmission device 100 to the measurement section 203 as information used to measure the communication status, for example.

The transfer section 202 transfers video and/or audio data obtained from the reception section 201 to the reception device 300. In the case where the transfer section 202 has received a retransmission request message from the reception device 300, the transfer section 202 transmits or retransmits data identical to lost data to the reception device 300. However, in the case where the data identical to the lost data has not been received from the transmission device 100, the transfer section 202 does not transmit or retransmit the data identical to the lost data to the reception device 300.

The measurement section 203 measures the communication status that indicates the frequency of occurrence of data loss during data communication between the transmission device 100 and the transfer device 200. Specifically, the measurement section 203 calculates the number of lost packets on the basis of the order of the sequence numbers of a plurality of packets that have arrived from the transmission device 100, for example. Then, the measurement section 203 measures the communication status by using the ratio of the number of lost packets to the total number of packets (the sum of the number of lost packets and the number of arrived packets) as the communication status, for example. Hereinafter, the ratio of the number of lost packets to the total number of packets is referred to as "packet loss rate".

The transmission section 204 transmits a retransmission request message to the transmission device 100 as instructed by the communication control apparatus 210. For example, the transmission section 204 repeatedly transmits a retransmission request message at an interval between transmissions determined by the communication control apparatus 210 until the number of repetitions reaches the number of request trials.

The communication control apparatus 210 controls recovery processing of recovering lost data during data communication from the transmission device 100 (first communication device) to the transfer device 200 (second communication device). The detailed configuration of the communication control apparatus 210 will be described below.

Configuration of Communication Control Apparatus

Figure 7:
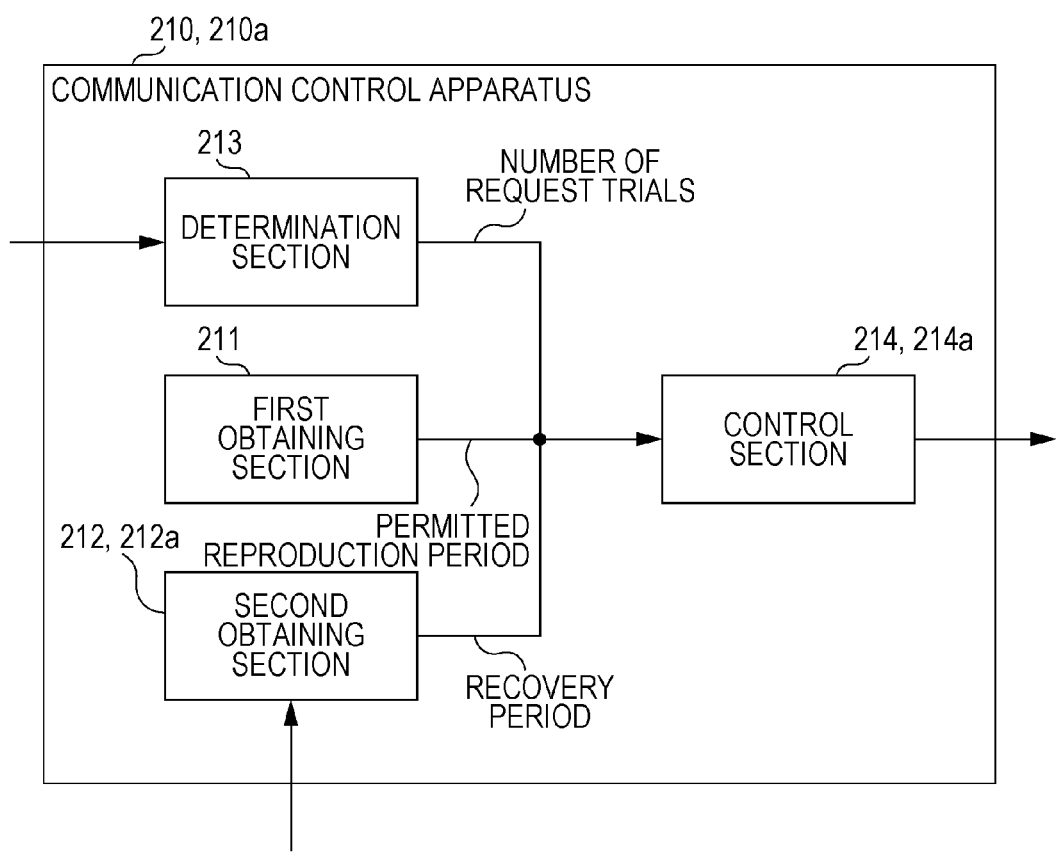
FIG. 7 is a diagram illustrating a configuration of a communication control apparatus according to the first and second embodiments.

FIG. 7 illustrates a configuration of the communication control apparatus 210 according to the first embodiment. The communication control apparatus 210 includes a first obtaining section 211, a second obtaining section 212, a determination section 213, and a control section 214.

The first obtaining section 211 obtains a permitted reproduction period of the transfer device 200. A permitted reproduction period is a time period from the time when data subsequent to lost data is received until the time up to which a delay in reproduction of data identical to the lost data is permitted. That is, the permitted reproduction period is a time period from the time when data loss is detected until the time up to which a delay in reproduction of data relating to the loss is permitted.

For example, the first obtaining section 211 may obtain the permitted reproduction period via an input device (not illustrated). Alternatively, the first obtaining section 211 may obtain the permitted reproduction period from a device outside the transfer device 200, for example.

The second obtaining section 212 obtains a recovery period used for recovery of lost data in the reception device 300. A recovery period is a time period needed to receive data identical to lost data which is retransmitted in response to a retransmission request message. For example, in the case where a retransmission request message is transmitted a plurality of times, the recovery period is a time period needed to receive retransmitted data identical to lost data the plurality of times.

For example, the second obtaining section 212 obtains the recovery period from the reception device 300. Alternatively, the second obtaining section 212 may obtain the recovery period of the reception device 300 from a monitoring server that monitors the communication, for example.

The determination section 213 determines the number of request trials, which is the number of transmission trials of a retransmission request message to be transmitted from the transfer device 200 to the transmission device 100, in accordance with the communication status that indicates the frequency of occurrence of data loss during data communication between the transmission device 100 and the transfer device 200. For example, the determination section 213 determines the number of request trials such that the number of request trials becomes larger as the frequency of data loss indicated by the communication status increases. Specifically, in the case where data communication between the transmission device 100 and the transfer device 200 is packet communication and the communication status includes the packet loss rate, for example, the determination section 213 determines the number of request trials such that the number of request trials becomes larger as the packet loss rate increases.

The control section 214 controls loss recovery processing in the transfer device 200 so that data loss is recovered in the transfer device 200 within a time difference between the permitted reproduction period and the recovery period (hereinafter referred to as "permitted recovery time"). Specifically, the control section 214 controls the interval between transmissions of a retransmission request message that requests retransmission of data identical to lost data in the case where the retransmission request message is repeatedly transmitted from the transfer device 200 to the transmission device 100, in accordance with the permitted recovery time to thereby control loss recovery processing in the transfer device 200. That is, the control section 214 controls the interval between transmissions of a retransmission request message so that transmission processing of transmitting a retransmission request message and reception processing of receiving retransmitted data identical to lost data are completed within the permitted recovery time.

Here, the control section 214 controls the interval between transmissions of a retransmission request message in accordance with the time difference between the permitted reproduction period and the recovery period (permitted recovery time) and the number of request trials determined by the determination section 213. Specifically, the control section 214 controls the interval between transmissions of a retransmission request message such that the interval between transmissions becomes shorter as the permitted recovery time for the number of request trials decreases.

Configuration of Reception Device

The reception device 300 includes a reception section 301, a transmission section 302, and a notification section 303.

The reception section 301 receives video and/or audio data from the transfer device 200. The reception section 301 transmits video and/or audio signals obtained by reproducing the received video and/or audio data to the output device 30. For example, the reception section 301 generates video and/or audio signals by decoding coded video and/or audio data and transmits the generated video and/or audio signals to the output device 30.

The transmission section 302 transmits a retransmission request message to the transfer device 200. For example, the transmission section 302 repeatedly transmits a retransmission request message at an interval between transmissions determined by a communication control apparatus (not illustrated) until the number of repetitions reaches the number of request trials, similarly to the transmission section 204 of the transfer device 200.

The notification section 303 communicates the recovery period of the reception device 300 to the transfer device 200. The notification section 303 need not directly communicate the recovery period to the transfer device 200. For example, the notification section 303 may communicate the recovery period to a device that is different from the transfer device 200. In this case, the transfer device 200 may obtain the recovery period of the reception device 300 from the device.

Operations

Next, operations performed by the transfer device 200 configured as described above will be described with reference to the drawings.

Operations Performed by Transfer Device

Figure 8:
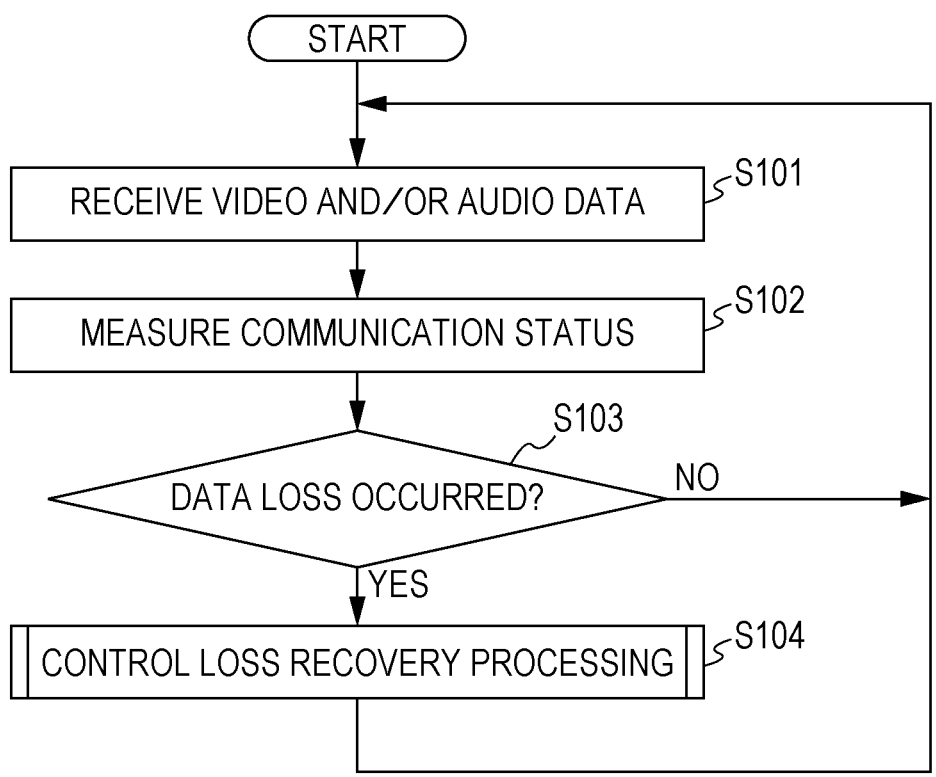
FIG. 8 is a flowchart illustrating processing operations performed by a transfer device according to the first embodiment.

FIG. 8 is a flowchart illustrating processing operations performed by the transfer device 200 according to the first embodiment.

First, the reception section 201 receives video and/or audio data from the transmission device 100 (step S101). The measurement section 203 measures the communication status (step S102), and determines whether or not data loss has occurred (step S103).

If data loss has not occurred (No in step S103), the flow returns to step S101. For example, in the case where the measurement section 203 has not detected loss of video and/or audio data, the measurement section 203 keeps measuring the communication status.

On the other hand, if data loss has occurred (Yes in step S103), the communication control apparatus 210 controls loss recovery processing (step S104), and the flow returns to step S101. For example, in the case where the measurement section 203 has detected loss of video and/or audio data, the communication control apparatus 210 controls loss recovery processing. Operations performed by the communication control apparatus 210 in step S104 will be described with reference to FIG. 9.

Operations Performed by Communication Control Apparatus

Figure 9:
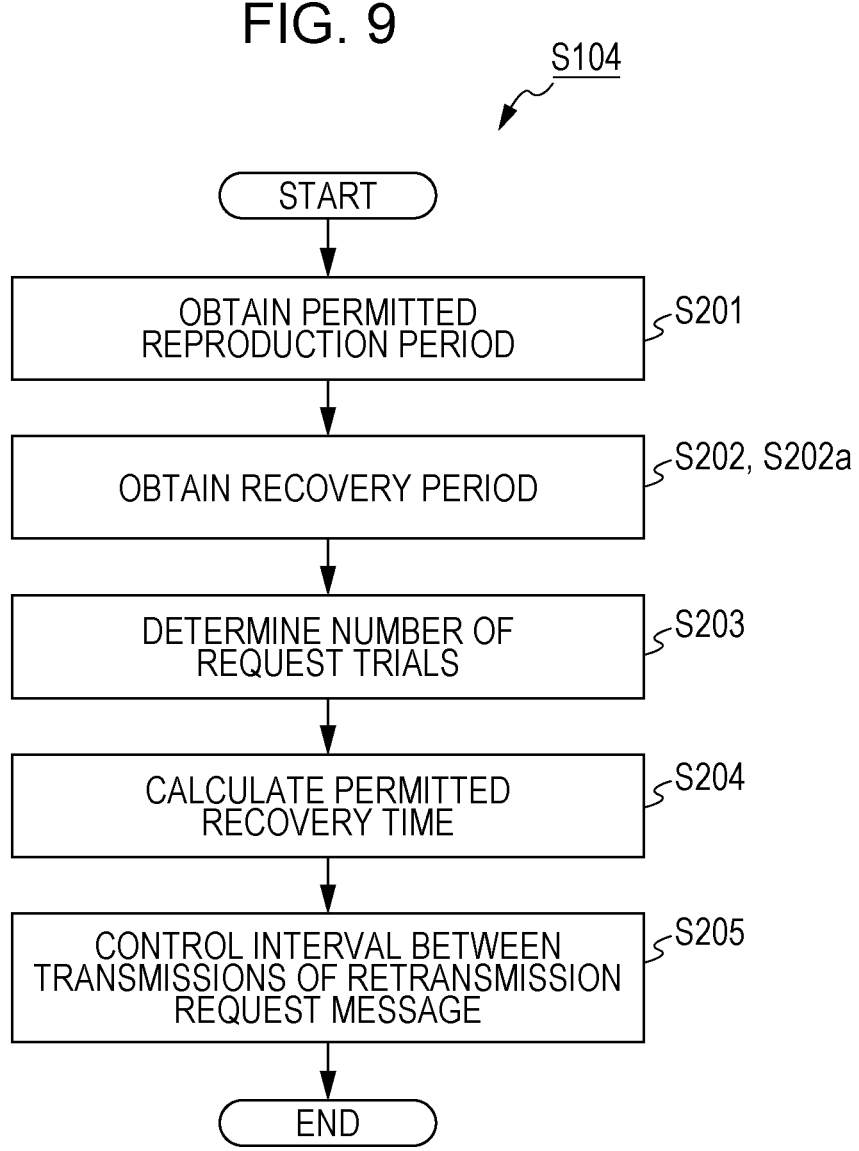
FIG. 9 is a flowchart illustrating processing operations performed by the communication control apparatus according to the first and second embodiments.
Figure 10:
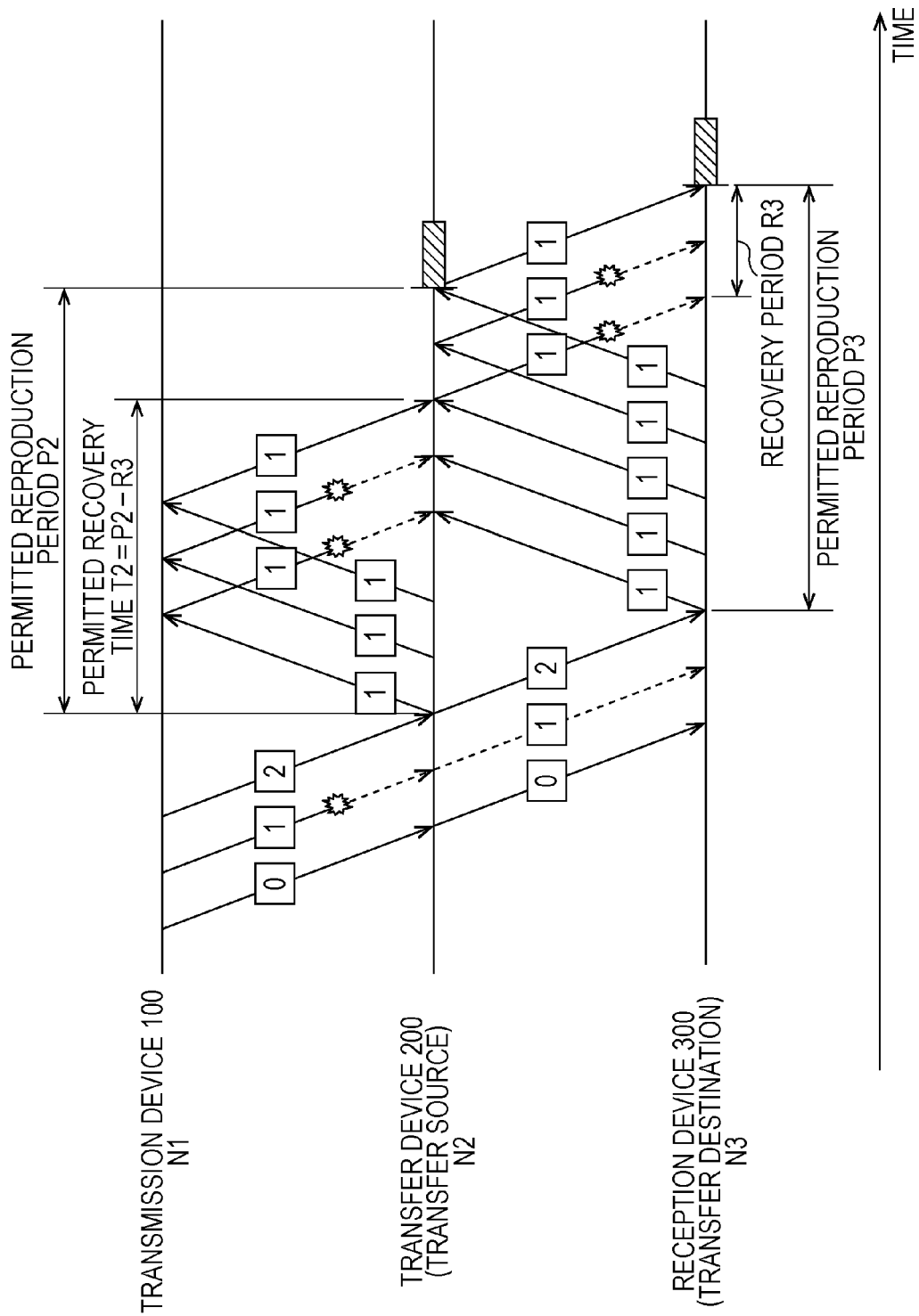
FIG. 10 is a diagram for describing an example of processing operations performed by the communication control apparatus.

FIG. 9 is a flowchart illustrating processing operations performed by the communication control apparatus 210 according to the first embodiment. That is, FIG. 9 illustrates the details of step S104 in FIG. 8. FIG. 10 is a diagram for describing an example of processing operations performed by the communication control apparatus 210. Hereinafter, the flowchart in FIG. 9 will be described with reference to FIG. 10.

First, the first obtaining section 211 obtains the permitted reproduction period (P2) of the transfer device 200 (step S201). The permitted reproduction period (P2) that has been obtained is inputted to the control section 214.

Next, the second obtaining section 212 obtains the recovery period (R3) of the reception device 300 (step S202). The recovery period (R3) that has been obtained is inputted to the control section 214.

The determination section 213 determines the number of transmission trials of a retransmission request message (the number of request trials) in accordance with the communication status (step S203). In FIG. 10, the determination section 213 determines the number of request trials to be three. The number of request trials that has been determined is inputted to the control section 214.

The control section 214 calculates the permitted recovery time (T2) of the transfer device 200 by subtracting the recovery period (R3) of the reception device 300 from the permitted reproduction period (P2) of the transfer device 200 (step S204).

The control section 214 controls the interval between transmissions of a retransmission request message to be transmitted a number of times equal to the number of request trials (three times in FIG. 10) so that data loss is recovered within the permitted recovery time (T2) in the transfer device 200 (step S205). Specifically, in FIG. 10, the interval between transmissions of a retransmission request message is controlled so that a retransmission request message is transmitted three times and a response (data identical to lost data) transmitted in response to the retransmission request message transmitted three times is received within the permitted recovery time (T2).

Here, a specific example of processing performed in order to determine the number of request trials in step S203 will be described. In the specific example, data communication between the transmission device 100 and the transfer device 200 is packet communication. Hereinafter, packetized lost data is called a lost packet. The communication status includes the packet loss rate LR1 in packet communication from the transmission device 100 to the transfer device 200.

It is assumed that loss of a retransmission request message is disregarded and the number of transmission trials of a retransmission request message is equal to the number of retransmission trials of data identical to lost data.

First, a method of calculating the number of retransmission trials K1 (the number of request trials) needed for a retransmitted packet identical to a lost packet to arrive at the transfer device 200 at least once will be described. The packet loss rate LR1 is the probability of loss of a packet when the packet is transmitted from the transmission device 100 to the transfer device 200 once. Therefore, in the case where a packet is transmitted K1 times, the probability of loss of the packet in all cases is expressed by $(LR1)^{K1}$. Accordingly, the determination section 213 calculates the number of retransmission trials K1 so as to satisfy expression (1) below. More specifically, the determination section 213 calculates the minimum value of the number of retransmission trials K1 that satisfies expression (1) below. As a result, the number of retransmission trials K1 needed for a retransmitted packet identical to a lost packet to arrive at the transfer device 200 at least once is calculated.

$$1-(LR1)^{K1} \geq \alpha 1 \qquad (1)$$

Here, α1 is a target value of the probability (transmission success rate) of a retransmitted packet identical to a lost packet arriving at the transfer device 200 at least once. α1 may be a predetermined value (for example, "0.999"). Alternatively, α1 may be determined adaptively in accordance with the importance of the lost packet.

As described above, the communication control apparatus 210 according to this embodiment is able to control loss recovery processing in the transfer device 200 so that data loss is recovered in the transfer device 200 within the time difference between the permitted reproduction period of the transfer device 200, which is a transfer source, and the recovery period of the reception device 300, which is a transfer destination. Therefore, the communication control apparatus 210 is able to recover data loss in the transfer device 200 while securing a time needed for recovery of the lost data in the reception device 300. That is, in the case where the transfer device 200 that has received data from the transmission device 100 transfers the data to the reception device 300, the communication control apparatus 210 is able to appropriately recover data loss.

Furthermore, the communication control apparatus 210 according to this embodiment is able to control the interval between transmissions of a retransmission request message in accordance with the time difference. Therefore, the communication control apparatus 210 need not change the number of transmission trials of a retransmission request message (the number of request trials) in order to recover data loss within the time difference. As a result, the communication control apparatus 210 is able to secure the number of transmission trials of a retransmission request message (the number of request trials) needed for recovery of lost data regardless of the time difference, and is able to appropriately recover the data loss in the transfer device 200.

Modified Example of First Embodiment

In the first embodiment described above, the communication control apparatus 210 controls loss recovery processing in accordance with the permitted reproduction period of the transfer device 200. However, the communication control apparatus 210 may control loss recovery processing selectively in accordance with the permitted reproduction period of the transfer device 200 or the permitted reproduction period of the reception device 300. A case where loss recovery processing is controlled selectively in accordance with the permitted reproduction period of the transfer device 200 or the permitted reproduction period of the reception device 300 will be described with reference to FIG. 10.

The first obtaining section 211 further obtains the permitted reproduction period (P3) of the reception device 300 in addition to the permitted reproduction period (P2) of the transfer device 200. The control section 214 compares the permitted reproduction period (P2) of the transfer device 200 with the permitted reproduction period (P3) of the reception device 300.

If the permitted reproduction period (P3) of the reception device 300 is shorter than the permitted reproduction period (P2) of the transfer device 200, the control section 214 controls loss recovery processing in the transfer device 200 in accordance with the permitted reproduction period (P3) of the reception device 300 instead of the permitted reproduction period (P2) of the transfer device 200. That is, in the case where the permitted reproduction period (P3) of the reception device 300 is shorter than the permitted reproduction period (P2) of the transfer device 200, the control section 214 controls loss recovery processing in the transfer device 200 so that data loss is recovered in the transfer device 200 within the time difference between the permitted reproduction period (P3) and the recovery period (R3) of the reception device 300.

As described above, the communication control apparatus 210 according to this modified example is able to control loss recovery processing in the transfer device 200 in accordance with the permitted reproduction period of the reception device 300 instead of the permitted reproduction period of the transfer device 200 in the case where the permitted reproduction period of the reception device 300 is shorter than the permitted reproduction period of the transfer device 200. Therefore, the communication control apparatus 210 is able to more appropriately secure a time needed for recovery of lost data in the reception device 300.

Second Embodiment

Next, a second embodiment will be described. In this embodiment, a case will be described where data transferred from a transfer device to a reception device is further transferred from the reception device to another reception device. That is, a case will be described where a transfer device transfers data to a reception device (transfer device) that corresponds to an internal node (a node that is not a leaf node).

Configuration

Figure 11:
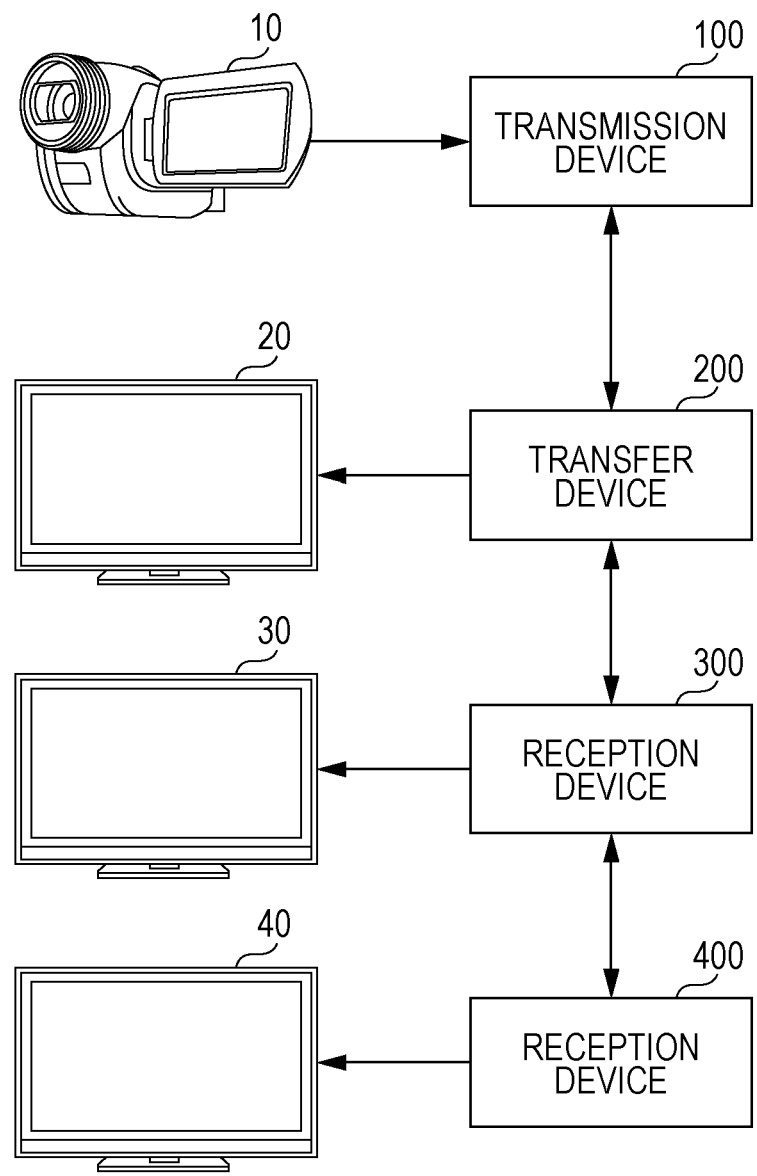
FIG. 11 is a diagram illustrating a configuration of a communication system according to the second embodiment.

FIG. 11 illustrates a configuration of a communication system according to the second embodiment. Note that the configuration of each device is similar to the configuration of the corresponding device in the first embodiment and therefore is not illustrated. In this embodiment, the reception device 300 transfers data to a reception device 400. The reception device 400 transmits video and/or audio signals to an output device 40.

As illustrated in FIG. 7, a communication control apparatus 210a includes the first obtaining section 211, a second obtaining section 212a, the determination section 213, and a control section 214a.

The second obtaining section 212a further obtains the second recovery period of the reception device 400 to which the reception device 300 transfers data, in addition to the first recovery period of the reception device 300 to which the transfer device 200 transfers data. The reception device 400 is an example of the fourth communication device.

The control section 214a controls loss recovery processing in the transfer device 200 so that data loss is recovered in the transfer device 200 within the time difference between the permitted reproduction period and the sum of the first recovery period and the second recovery period.

Operations

Next, processing operations performed by the communication control apparatus 210a configured as described above will be described with reference to FIGS. 9 and 12.

Figure 12:
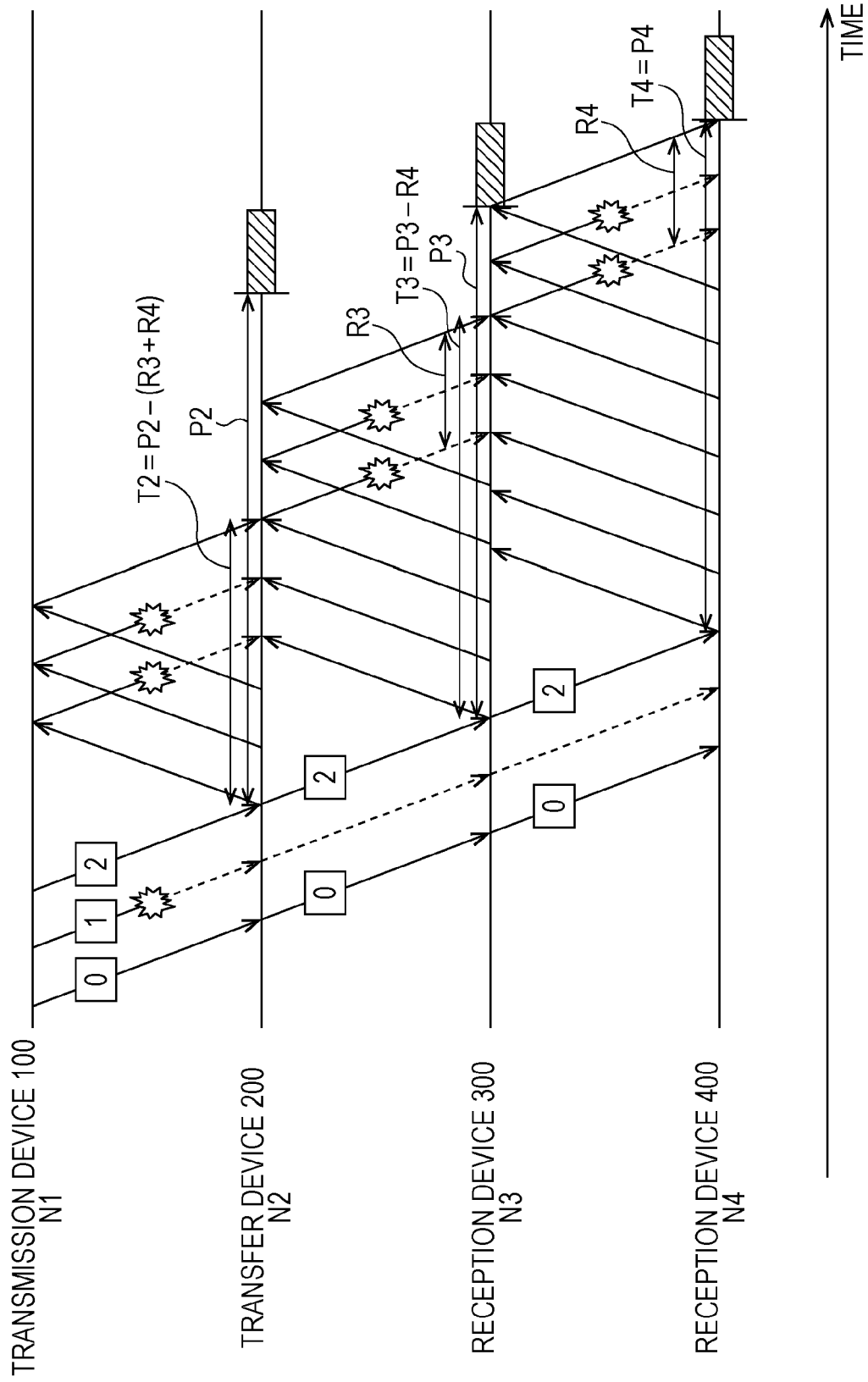
FIG. 12 is a diagram for describing operations performed by a communication control apparatus according to the second embodiment.

FIG. 12 is a diagram for describing operations performed by the communication control apparatus 210a according to the second embodiment.

After the permitted reproduction period (P2) has been obtained, the second obtaining section 212a obtains the first recovery period (R3) of the reception device 300 and the second recovery period (R4) of the reception device 400 (step S202a). The second recovery period (R4) is transmitted from the reception device 400 to the reception device 300 and is further transmitted from the reception device 300 to the transfer device 200. The determination section 213 determines the number of request trials (step S203).

The control section 214a calculates the permitted recovery time (T2) by subtracting the sum of the first recovery period (R3) and the second recovery period (R4) from the permitted reproduction period (P2) (step S204a). The control section 214a thereafter controls the interval between transmissions of a retransmission request message to be transmitted a number of times equal to the number of request trials (three times in FIG. 12) so that data loss is recovered within the permitted recovery time (T2) (step S205).

As described above, the communication control apparatus 210a according to this embodiment is able to, in the case where data is transferred to the reception device 400 from the reception device 300 that has received the data from the transfer device 200, control loss recovery processing in the transfer device 200 so that data loss is recovered in the transfer device 200 within the time difference between the permitted reproduction period of the transfer device 200 and the sum of the first recovery period of the reception device 300 and the second recovery period of the reception device 400. Therefore, the communication control apparatus 210a is able to recover data loss in the transfer device 200 while securing a time available for recovery of the lost data in the reception device 300 and the reception device 400.

Other Embodiments

While a communication control apparatus according to one aspect or a plurality of aspects has been described with reference to embodiments, the present disclosure is not limited to the embodiments. Various modifications to the embodiments that may be conceived by those skilled in the art or an embodiment configured by combining constituent elements in different embodiments may be included in the scope of one aspect or a plurality of aspects, without departing from the essence of the present disclosure.

Hereinafter, other embodiments will all be described.

In the embodiments described above, an example of a case has been described where data communication is communication performed over the Internet, however, the data communication need not be communication performed over the Internet. For example, the data communication may be communication performed over a wired or wireless network, such as a local area network or a wide area network. The data communication may be mobile communication used by a portable phone or the like. Furthermore, the data communication need not be packet communication.

In the embodiments described above, an example of a case has been described where the communication system is a remote display system, however, the communication system need not be a remote display system. For example, the communication system may be a system in which text data, image data, program data, or the like is transmitted from the first communication device to the second communication device.

In the embodiments described above, the communication control apparatus is integrated into the transfer device, however, the communication control apparatus need not be integrated into the transfer device. The communication control apparatus may be configured as an apparatus provided separately from the transfer device. For example, the communication control apparatus may be integrated into a server that is connected to a plurality of transfer devices over the network. In such a case, the communication control apparatus may control the plurality of transfer devices.

In the embodiments described above, the number of request trials is determined in accordance with the communication status, however, the number of request trials need not be determined in this way. For example, a retransmission request message may be transmitted a number of times equal to a predetermined number of request trials regardless of the communication status. In this case, the communication control apparatus need not include the determination section.

In the embodiments described above, an example of a case has been described where the communication status includes the packet loss rate, however, the communication status need not include the packet loss rate. That is, the communication status may indirectly indicate the frequency of occurrence of data loss. For example, the communication status may include the congestion degree of the communication paths, the communication load, information about occurrence of communication failures, or the like.

In the embodiments described above, the number of request trials is calculated so as to satisfy expression (1), however, calculation need not necessarily be performed in this way. The number of request trials may be calculated using a function of the frequency of occurrence of data loss. The number of request trials may be determined by referring to a table in which the number of request trials that corresponds to the frequency of occurrence of data loss is registered.

Note that, in the embodiments described above, each constituent element may be configured by using dedicated hardware or by executing a software program applicable to each constituent element. Each constituent element may be implemented in such a manner that a program execution section, such as a central processing unit (CPU), a processor, or the like, reads and executes a software program recorded in a recording medium, such as a hard disk, a semiconductor memory, or the like. Here, software that implements the communication control apparatuses or the like according to the embodiments described above is a program as described below.

That is, the program causes a computer to perform a communication control method of controlling, in a second communication device, recovery of lost data in data communication from a first communication device to the second communication device, the second communication device reproducing data received from the first communication device and transferring the data to a third communication device. The communication control method includes a first obtaining step of obtaining a permitted reproduction period of the second communication device, the permitted reproduction period being a time period from a time when data subsequent to lost data is received until a time up to which reproduction of data identical to the lost data is permitted, a second obtaining step of obtaining a first recovery period used for recovery of the lost data in the third communication device, and a control step of controlling loss recovery processing in the second communication device so that the lost data is recovered in the second communication device within a time difference between the permitted reproduction period and the first recovery period.

INDUSTRIAL APPLICABILITY

The present disclosure is able to improve the reproduction quality of images and/or sounds and therefore is applicable to, for example, a video conference system in which video and/or audio data are transmitted and received.

CROSS REFERENCE TO RELATED APPLICATION

The present application claims the benefit of Japanese Patent Application No. 2013-187927 filed on Sep. 11, 2013. The entire disclosure of the above-identified application, including the specification, drawings and claims, is incorporated herein by reference in its entirety.

What is claimed is:

1. A communication control apparatus that controls, in a second communication device, data communication from a first communication device to the second communication device, the second communication device transferring data received from the first communication device to a third communication device, the communication control apparatus comprising:

a first obtaining section configured to obtain a permitted reproduction period of the second communication device, the permitted reproduction period being a time period from a time when the second communication device receives data subsequent to lost data until a time up to which reproduction of data identical to the lost data is permitted;

a second obtaining section configured to obtain a first recovery period used for recovery of the lost data in the third communication device; and a control section configured to control loss recovery processing in the second communication device, the lost data being recovered by the second communication device within a time difference that is a period obtained by subtracting the first recovery period from the permitted reproduction period.

2. The communication control apparatus according to claim 1, wherein
the control section controls the loss recovery processing in the second communication device by controlling, in accordance with the time difference, an interval between transmissions of a retransmission request message that requests retransmission of the data identical to the lost data in the case where the retransmission request message is repeatedly transmitted from the second communication device to the first communication device.

3. The communication control apparatus according to claim 2, further comprising:
a determination section configured to determine a number of request trials, which is a number of transmission trials of the retransmission request message to be transmitted from the second communication device to the first communication device, in accordance with a communication status that indicates a frequency of occurrence of data loss during data communication between the first communication device and the second communication device, wherein
the control section controls the interval between transmissions in accordance with the time difference and the number of request trials.

4. The communication control apparatus according to claim 3, wherein
the data communication between the first communication device and the second communication device is packet communication,
the communication status includes a packet loss rate in the packet communication between the first communication device and the second communication device, and
the determination section determines the number of request trials such that the number of request trials becomes larger as the packet loss rate increases.

5. The communication control apparatus according to claim 4, wherein
in a case where the number of request trials is denoted by K1, the packet loss rate is denoted by LR1, and a target value of a probability of the retransmitted data identical to the lost data arriving at the second communication device at least once is denoted by $\alpha1$, an expression, $1-(LR1)^{K1} \geq \alpha1$, is satisfied.

6. The communication control apparatus according to claim 5, wherein
the data transferred from the second communication device to the third communication device is further transferred from the third communication device to a fourth communication device,
the second obtaining section further obtains a second recovery period used for recovery of the lost data in the fourth communication device, and
the control section controls the loss recovery processing in the second communication device so that the lost data is recovered in the second communication device within a time difference between the permitted reproduction period and the sum of the first recovery period and the second recovery period.

7. The communication control apparatus according to claim 6, wherein
the first obtaining section further obtains a permitted reproduction period of the third communication device, and
the control section controls the loss recovery processing in the second communication device in accordance with the permitted reproduction period of the third communication device instead of the permitted reproduction period of the second communication device in a case where the permitted reproduction period of the third communication device is shorter than the permitted reproduction period of the second communication device.

8. The communication control apparatus according to claim 1,
the communication control apparatus being configured as an integrated circuit.

9. A communication control method of controlling, in a second communication device, data communication from a first communication device to the second communication device, the second communication device transferring data received from the first communication device to a third communication device, the communication control method comprising:
a first obtaining step of obtaining a permitted reproduction period of the second communication device, the permitted reproduction period being a time period from a time when the second communication device receives data subsequent to lost data until a time up to which reproduction of data identical to the lost data is permitted;
a second obtaining step of obtaining a first recovery period used for recovery of the lost data in the third communication device; and
a control step of controlling loss recovery processing in the second communication device, the lost data being recovered by the second communication device within a time difference that is a period obtained by subtracting the first recovery period from the permitted reproduction period.

10. A computer-readable non-transitory recording medium recording a program that causes a computer to perform the communication control method according to claim 9.

* * * * *